US011824888B1

(12) United States Patent
Vandeventer et al.

(10) Patent No.: US 11,824,888 B1
(45) Date of Patent: Nov. 21, 2023

(54) APPARATUS AND METHOD FOR ASSESSING SECURITY RISK FOR DIGITAL RESOURCES

(71) Applicant: Second Sight Data Discovery, Inc., Bloomington, IN (US)

(72) Inventors: Reuben Vandeventer, Bloomington, IN (US); David Imrem, Bloomington, IN (US)

(73) Assignee: Second Sight Data Discovery, Inc., Bloomington, IN (US)

( * ) Notice: Subject to any disclaimer, the term of this patent is extended or adjusted under 35 U.S.C. 154(b) by 0 days.

(21) Appl. No.: 18/073,202

(22) Filed: Dec. 1, 2022

(51) Int. Cl.
*H04L 29/06* (2006.01)
*H04L 9/40* (2022.01)
*H04L 41/16* (2022.01)

(52) U.S. Cl.
CPC .......... *H04L 63/1433* (2013.01); *H04L 41/16* (2013.01); *H04L 63/20* (2013.01)

(58) Field of Classification Search
CPC ...... H04L 63/1433; H04L 63/20; H04L 41/16
See application file for complete search history.

(56) References Cited

U.S. PATENT DOCUMENTS

| | | | |
|---|---|---|---|
| 9,930,061 B2 | 3/2018 | Zandani | |
| 10,491,619 B2 | 11/2019 | Yampolskiy | |
| 11,017,088 B2* | 5/2021 | Luthra | .......... G06F 21/577 |
| 11,140,193 B2* | 10/2021 | Patel | ............ G06F 21/577 |
| 11,157,629 B2 | 10/2021 | Shenoy | |
| 11,164,669 B1* | 11/2021 | Neumann | ........... G16H 70/60 |
| 11,611,590 B1* | 3/2023 | Amar | ............ G06Q 30/018 |
| 2020/0089848 A1 | 3/2020 | Abdelaziz | |

* cited by examiner

*Primary Examiner* — Tri M Tran
(74) *Attorney, Agent, or Firm* — CALDWELL INTELLECTUAL PROPERTY LAW

(57) ABSTRACT

An apparatus and method for assessing security risk for digital resources are described. The apparatus includes at least a processor and a memory communicatively coupled to the at least a processor. The memory includes instructions configuring the at least a processor to receive digital resource data about a plurality of digital resources in a digital environment, calculate a resource significance score for each digital resource based on the digital resource data, determine at least one critical resource as a function of the resource significance score, and analyze a digital security risk associated with the at least one critical resource.

20 Claims, 7 Drawing Sheets

APPARATUS AND METHOD FOR ASSESSING SECURITY RISK FOR DIGITAL RESOURCES

FIELD OF THE INVENTION

The present invention generally relates to the field of cyber security. In particular, the present invention is directed to an apparatus and method for assessing security risk for digital resources.

BACKGROUND

In recent years, cyber security has become increasingly important as much of the world's information is stored digitally. Modern cyber security solutions have to account many computing devices and programs. However, it may be difficult to focus on individual computing devices and programs that may need attention.

SUMMARY OF THE DISCLOSURE

In an aspect, an apparatus for assessing security risk for digital resources is provided. The apparatus includes at least a processor and a memory communicatively coupled to the at least a processor. The memory includes instructions configuring the at least a processor to receive digital resource data about a plurality of digital resources in a digital environment, calculate a resource significance score for each digital resource based on the digital resource data, determine at least one critical resource as a function of the resource significance score, and analyze a digital security risk associated with the at least one critical resource.

In another aspect, a method for assessing security risk for digital resources is provided. The method includes receiving, by at least a processor, digital resource data about a plurality of digital resources in a digital environment, calculating, by the at least a processor, a resource significance score for each digital resource based on the digital resource data, determining, by the at least a processor, at least one critical resource as a function of the resource significance score, and analyzing, by the at least a processor, a digital security risk associated with the at least one critical resource These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatuses and methods for assessing security risk for digital resources. In various embodiments, at least one critical resource is determined for a digital environment. Aspects of the current disclosure allow for efficient and accurate identification of critical individual computing resources.

Exemplary embodiments illustrating aspects of the present disclosure are described below in the context of several specific examples.

Figure 1:
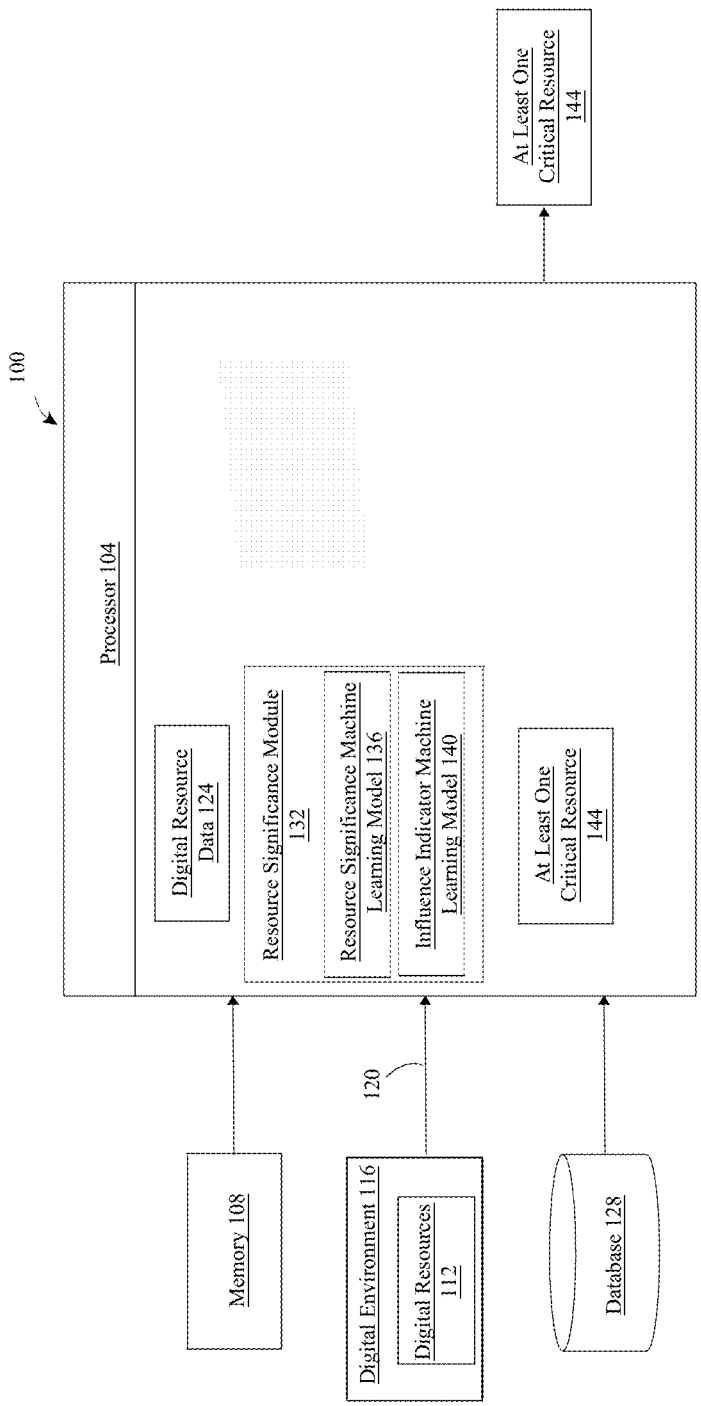
FIG. 1 is a block diagram of an apparatus for assessing security risk for digital resources.

Referring now to FIG. 1, an exemplary embodiment of an apparatus 100 for assessing security risk for digital resources is illustrated. Apparatus 100 includes a processor 104. Processor 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the worker, in an embodiment, this may enable scalability of apparatus 100 and/or computing device.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, processor 104 may further comprise and/or be included in a server. A server may include a computing device and/or a plurality of computing devices that provides functionality for other programs or devices. A server may provide various functionalities such as sharing data or resources and performing computation among multiple other programs and or devices. Servers may include database servers, file servers, mail servers, print servers, web servers, and/or application servers. In an embodiment, the server may communicate with a digital environment through a communication network. A communication network may include a network interface card (e.g., a mobile network interface card, a LAN card), a modem, and any combination thereof. A communication network may also include a wide area network (e.g., the Internet, an enterprise network), a local area network (e.g., a network associated with an office, a building, a campus or other relatively small geographic space), a telephone network, a data network associated with a telephone/voice provider (e.g., a mobile communication provider data and/or voice network), a direct connection between two computing devices, and any combination thereof. A communication network may employ a wired and/or wireless mode of communication. In general, any network topology may be used. Information may be communicated to and/or from digital wallet through a communication network. In a non-limiting example, processor 104 may include security protections against software or software and hardware attacks, including without limitation attack scenarios in which a malicious actor may attempt to extract cryptographic keys for purpose of spoofing the key, the modify computer code, data or memory structures or similar; such protections may include, without limitation, a secure computing module or elements thereof as disclosed in further detail below. Processor 104 may also include public/private key pairs or other cryptographic key pairs, including without limitation symmetric public keys, elliptic curve based, keys, asymmetric public keys, and the like, or mechanisms to create them, for purposes of cryptographically authenticating the validity of processor 104 to another device, authenticating the validity of secure software loaded onto the device, or other data, including without limitation inputs, outputs, time of loading, and/or time of execution of software, boot sessions, or the like.

With continued reference to FIG. 1, processor 104 may perform determinations, classification, and/or analysis steps, methods, processes, or the like as described in this disclosure using machine-learning processes. A "machine-learning process," as used in this disclosure, is a process that automatedly uses a body of data known as "training data" and/or a "training set" (described further below in this disclosure) to generate an algorithm that will be performed by a processor 104/module to produce outputs given data provided as inputs; this is in contrast to a non-machine learning software program where the commands to be executed are determined in advance by a user and written in a programming language. Machine-learning process may utilize supervised, unsupervised, lazy-learning processes and/or neural networks, described further below.

Continuing to reference to FIG. 1, a computing device and/or apparatus 100 may include a memory 108 and at least a processor 104. Memory 108 may include any memory as described in this disclosure. Memory 108 may be communicatively connected to processor 104. As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure. Memory 108 may be configured to provide instructions to processor 104, which may include any processor as described in this disclosure.

Still referencing FIG. 1, processor 104 is configured to receive digital resource data about a plurality of digital resources 112. As used in this disclosure, a "digital resource"

is any software that makes up a computer system and/or digital environment 116 as well as any software or device that can be accessed from that computer system and/or digital environment. "Digital resource data," as used in this disclosure is any data and/or information about digital resources. Further, as used in this disclosure, "digital environment" is an integrated communications environment where digital devices communicate and manage data and interactions within the digital environment 116. Digital device may be any computing device as described in this disclosure, for example as described in FIG. 6. For example, the digital environment 116 may be one of a computer system, computer network, and the like. In an exemplary embodiment, the digital environment 116 may include a plurality of user devices. A "user device," for the purpose of this disclosure, is any additional computing device, such as a mobile device, laptop, desktop computer, or the like. In a non-limiting embodiment, user device may be a computer and/or smart phone operated by a user in a remote location. User device may include, without limitation, a display; the display may include any display as described in the entirety of this disclosure such as a light emitting diode (LED) screen, liquid crystal display (LCD), organic LED, cathode ray tube (CRT), touch screen, or any combination thereof. In a non-limiting embodiment, user device may include a graphical user interface (GUI) configured to display any information from apparatus 100 and/or any computing device. In some embodiments, the digital environment 116 may also include any electronically based asset associated with the digital environment 116, as described in more detail below. For example, electronically based digital assets may be computer programs, data, data stores, and the like, but are not limited to such examples. The digital environment 116 may be connected to the processor 104 by a network 120, as described in more detail above.

Continuing to reference FIG. 1, in an embodiment, digital resource 112 may be a user device, a data processing computing program operating on a computing device, and the like. Each digital resource may be connected by a communication network. The communication network may include a wide area network (e.g., the Internet, an enterprise network), a local area network (e.g., a network associated with an office, a building, a campus or other relatively small geographic space), a telephone network, a data network associated with a telephone/voice provider (e.g., a mobile communication provider data and/or voice network), a direct connection between two computing devices, and any combination thereof. A communication network may employ a wired and/or wireless mode of communication. Further, the digital environment 116 may employ any type of network architecture. For example, the digital environment 116 may employ a peer to peer (P2P) architecture where each computing device in a computing network is connected with every computing device in the network and every computing device acts as a server for the data stored in the computing device. In a further exemplary embodiment, the digital environment 116 may also employ a client server architecture where a computing device is implemented as a central computing device (e.g., server) that is connected to each client computing device and communication is routed through the central computing device. However, the network architecture is not limited thereto. One skilled in the art will recognize the various network architectures that may be employed by the digital environment. Further, any network topology may be used. For example, the digital environment 116 may employ a mesh topology where a computing device is connected to one or multiple other computing devices using point to point connections. However, the network topology is not limited thereto. One skilled in the art will recognize the various network architectures that may be employed by the digital environment.

Still referring to FIG. 1, as described above, digital resource data 124 is any data and/or information about digital resources 112. For example, digital resource data 124 may include frequency of use data for digital resources, users associated with the digital resource, and the like. Further, digital resource data 124 may be specification data, program data, and the like for the plurality of digital resources in digital environment 116. In a further exemplary embodiment, the digital profile data may include a number of computer programs used in the digital environment 116, a number of computing devices, connections between computer programs, and the like. In an embodiment, digital resource data 124 may be obtained from a database, such as database 128. Database 128 may be implemented, without limitation, as a relational database, a key-value retrieval database such as a NOSQL database, or any other format or structure for use as a database that a person skilled in the art would recognize as suitable upon review of the entirety of this disclosure. Database 128 may alternatively or additionally be implemented using a distributed data storage protocol and/or data structure, such as a distributed hash table or the like. Database 128 may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Continuing to reference FIG. 1, in an embodiment, additionally, or alternatively, the receiving digital resource data 124 may comprise receiving user input from a plurality of users in the digital environment, wherein the user input comprises user resource significance data. As used in this disclosure, a "user input," is a form of data entry received from an individual and/or group of individuals, such as an individual and/or group of individuals that is using and/or interacting with apparatus 100. In some cases, user input may include selecting a selection from plurality of selections as an answer. In other cases, user input may include a free user input as an answer to a user prompt. In an embodiment, the user input may include user resource significance data. As used in this disclosure, "user resource significance data" is data from a user input indicating a significance of at least a digital resource as determined by the user. In an exemplary embodiment, user resource significance data may be a ranking out of five stars, out of a scale of 1-10, a percentage score, and the like indicating a level of significance for a digital resource for the user. Alternatively, or additionally, the user resource significance data may be an alphabetic score indicating a level of significance for a digital resource for the user, such as, but not limited to, "A+," "A," "A-," "B+," "B," "B-," "C+," "C," "C-," "D+," "D," "D-," "F," and the like. Additionally, or alternatively, the user resource significance data may be a ranked list of digital resources based on significance to the user.

Still referring to FIG. 1, in an embodiment, the receiving user input may comprise receiving the user input using a digital resource query. As used in this disclosure, a "digital resource query" is a set of questions and/or prompts that ask for information relating to digital resources, wherein each question and/or prompts induce answers that affect any processing step described in this disclosure. In some exemplary embodiments, user inputs to questions and/or prompts within digital resource query may include selecting a selection from plurality of selections as an answer. Additionally, or alternatively, user inputs to questions and/or prompts within digital resource query may include a free user input as answer. In a non-limiting exemplary embodiment, smart assessment may include a question asking the user about a digital resource most significant to the user; for instance, the question may be "What digital resource is integral to your day-to-day activity?" In some cases, digital resource query may be a survey, transactional tracking, an interview, a report, events monitoring, and the like. In an exemplary embodiment, processor 104 may be configured to generate and/or modify the digital resource query based on a selection of a particular digital resource.

Continuing to reference FIG. 1, processor 104 is further configured to calculate a resource significance score for each digital resource based on the digital resource data 124. For example, processor 104 may be configured to generate a resource significance score for each digital resource based on the digital resource data 124 for each of the digital resources. As used in this disclosure, "resource significance score" is a score indicating a level of significance of at least a digital resource. In an exemplary embodiment, resource significance score may be a ranking out of five stars, out of a scale of 1-10, a percentage score, and the like indicating a level of significance for a digital resource to the digital environment. Alternatively, or additionally, the user resource significance data may be an alphabetic score indicating a level of significance for a digital resource to the digital environment, such as, but not limited to, "A+," "A," "A−," "B+," "B," "B−," C+," "C," "C−," D+," "D," "D−," "F," and the like. Additionally, or alternatively, in an embodiment, the calculating a resource significance score may comprise calculating the resource significance score based on the user resource significance data. For example, user resource significance data may be used by processor 104 as a basis for the calculation of the resource significance score.

Continuing to reference FIG. 1, processor 104 may use a machine learning module, such as resource significance module 132, to implement one or more algorithms or generate one or more machine-learning models, such as resource significance machine learning model 136, to calculate the resource significance scores. However, the machine learning module is exemplary and may not be necessary to generate one or more machine learning models and perform any machine learning described herein. In one or more embodiments, one or more machine-learning models may be generated using training data. Training data may include inputs and corresponding predetermined outputs so that a machine-learning model may use correlations between the provided exemplary inputs and outputs to develop an algorithm and/or relationship that then allows machine-learning model to determine its own outputs for inputs. Training data may contain correlations that a machine-learning process may use to model relationships between two or more categories of data elements. Exemplary inputs and outputs may come from a database, such as any database described in this disclosure, or be provided by a user. In other embodiments, a machine-learning module may obtain a training set by querying a communicatively connected database that includes past inputs and outputs. Training data may include inputs from various types of databases, resources, and/or user inputs and outputs correlated to each of those inputs so that a machine-learning model may determine an output. Correlations may indicate causative and/or predictive links between data, which may be modeled as relationships, such as mathematical relationships, by machine-learning models, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements. Resource significance module 132 may be used to generate resource significance machine learning model 136 and/or any other machine learning model, such as influence indicator machine learning model described below, using training data. Resource significance machine learning model 136 may be trained by correlated inputs and outputs of training data. Training data may be data sets that have already been converted from raw data whether manually, by machine, or any other method. Training data may include previous outputs such that resource significance machine learning model 136 iteratively produces outputs. Resource significance machine learning model 136 using a machine-learning process may output converted data based on input of training data.

Continuing to reference FIG. 1, in an embodiment, processor 104 may be configured to calculate a resource significance score for each digital resource based on the digital resource data 124 using a machine learning model, such as resource significance machine learning model 136 generated by resource significance module 132. Resource significance machine learning model 136 may be trained by training data, discussed in further detail below, such as resource significance training data. Resource significance training data may be stored in database 128.

With continued reference to FIG. 1, calculating a resource significance score for each digital resource based on the digital resource data 124 using a machine learning model may include receiving resource significance training data. In an embodiment, resource significance training data may include a plurality of digital resource data 124 that are each correlated to one of a plurality of resource significance data. For example, resource significance training data may be used to show digital resource data 124 and/or user resource significance data may indicate a particular resource significance score. In an exemplary embodiment, a resource significance score may be high, average, low, and the like. In a further embodiment, resource significance training data may also include a plurality of digital resource data 124 and/or user resource significance data that are each correlated to one resource significance score of a plurality of resource significance scores. In such an embodiment, resource significance training data may be used to show how digital resource data 124 and/or user resource significance data may indicate a particular resource significance score for digital resources. Calculating a resource significance score for each digital resource based on the digital resource data 124 using a machine learning model may further include training a resource significance machine learning model 136 as a function of resource significance training data. Further, calculating a resource significance score for each digital resource based on the digital resource data 124 using a machine learning model may also include calculating the resource significance score for each digital resource using the trained resource significance machine learning model 136.

Still referring to FIG. 1, processor 104 may be configured to determine an influence indicator for each of the plurality of users. As used in this disclosure, "influence indicator" is an indicator of a level of authority and/or credibility associated with a user for determining a digital resource significance to the digital environment. For example, certain users may have increased levels of interactions with digital resources compared to other users and may have a higher level of understanding of significance of these digital resources than users who have more limited interactions with digital resources. Further, in an embodiment, the influence indicator may include increased influence users, average influence users, decreased influence users, and the like. As used in this disclosure, "increased influence" are users who may have a greater understanding of the significance of a digital resource and may have a greater effect on a resource significance score. "Average influence users," as used in this disclosure are users who may have an average understanding of the significance of a digital resource and may have neither a greater nor a decreased effect on a resource significance score. Further, as used in this disclosure, "decreased influence users" are users who may have a decreased level of understanding of the significance of a digital resource and may have a decreased effect on a resource significance score. Alternatively, or additionally, a fuzzy inferencing system for determination of an influence indicator may be employed, where any or all influence indicators may be represented as values and/or fuzzy sets for linguistic variables measuring the same, as described in more detail in FIG. 5. An inferencing system may use one or more fuzzy inferencing rules, as described below in FIG. 5, to output one or more linguistic variable values and/or defuzzified values indicating a plurality of influence indicators.

Continuing to reference FIG. 1, in an embodiment, processor 104 may be configured to determine the influence indicator for each of the plurality of users using a machine learning model, such as an influence indicator machine learning model 140 generated by resource significance module 132. Influence indicator machine learning model may be trained by training data, discussed in further detail below, such as influence indicator training data. Influence indicator training data may be stored in database 128.

With continued reference to FIG. 1, determining the influence indicator for each of the plurality of users using a machine learning model may include receiving influence indicator training data. In an embodiment, influence indicator training data may include a plurality of user data that are each correlated to one of a plurality of influence indicator data. For example, influence indicator training data may be used to show how user data may indicate a particular influence indicator. In an exemplary embodiment, an influence indicator may be high, average, low, and the like. In a further embodiment, influence indicator training data may also include a plurality of influence indicator data that are each correlated to one influence indicator of a plurality of influence indicators. In such an embodiment, influence indicator training data may be used to show how user data may indicate a particular influence indicator for users. Calculating the influence indicator for each user based on the using a machine learning model may further include training an influence indicator machine learning model as a function of influence indicator training data. Further, calculating the influence indicator for each of the plurality of users using a machine learning model may also include calculating the influence indicator for each user using the trained influence indicator machine learning model.

Continuing to reference FIG. 1, additionally, or alternatively, the determining the influence indicator for each of the plurality of users may comprise generating, by the at least a processor 104, an influence indicator classifier. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Processor 104 and/or another device may generate a classifier using a classification algorithm, defined as a process whereby a processor 104 derives a classifier from training data. Classification may be performed using, without limitation, linear classifiers such as without limitation logistic regression and/or naïve Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 1, processor 104 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A)\ P(A)\div P(B)$, where $P(AB)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device 104 may then calculate a likelihood table by calculating probabilities of different data entries and classification labels. Processor 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, processor 104 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values. Influence indicator classifier may classify user data to one or more types and/or category of influence indicator, which may include any type of influence indicator, sub-categories and/or more specific categories, or the like. For instance, influence indicator classifier may receive user data and may classify the user to an influence indicator. Influence indicator classifier may be trained using training data correlating user data to categories of influence indicator. Additionally, or alternatively, the determining the influence indicator for each of the plurality of users may comprise classifying, by the at least a processor, the user associated with user data to at least one influence indicator using the influence indicator classifier and outputting, by the at least a processor, the at least one influence indicator for each user.

Still referring to FIG. 1, additionally, or alternatively, processor 104 may be configured to calculate the resource significance score for each digital resource based on the digital resource data 124, user input, and the influence indicator. For example, each of the digital resource data 124, user input, and the influence indicator may be used by processor 104 as a basis for the calculation of the resource significance score. In a further exemplary embodiment, user input from a user with a greater influence indicator may be weighted more in the calculation of the resource significance score. Additionally, or alternatively, in an embodiment, user input from a user with a lesser influence indicator may be weighted less in the calculation of the resource significance score.

Continuing to refer to FIG. 1, processor 104 may be configured to compile operation data for the plurality of digital resources and digital environment. In an embodiment, processor 104 may be configured to monitor and store operation data relating to each digital resource in a digital environment and the digital environment. As used in this disclosure, "operation data" is data gathered about the number of times a digital resource and/or digital environment is used for computing operations. For example, operation data may be a number of times each digital resource in the digital environment is used by users. Further, additionally, or alternatively, operation data may include a total amount of operations and/or data processed by the digital environment. In a further non-limiting example, operation data may include revenue data. As used in this disclosure, "revenue data" is data related to revenue generated by digital resources and/or the digital environment. In an embodiment, processor 104 may be configured to collect operation data and store operation data in a database, for example database 128. For example, processor 104 may be configured to track digital resource usage and digital environment usage and processor 104 may be configured to generate operation data based on the tracked digital resource and digital environment usage. Further, processor 104 may be configured to receive stored operation data from a database.

Still referring to FIG. 1, processor 104 may be configured to compare the operation data for each digital resource of the plurality of digital resources and the operation data for the digital environment. For example, processor 104 may be configured to compare the operation data for an accounting digital resource to the operation data for the computer network connected to the accounting digital resource and determine a relative magnitude of operations of the digital resource relative to the whole digital environment. Additionally, or alternatively, processor 104 may be configured to determine a utilization indicator for each digital resource of the plurality of digital resources based on the comparison of the operation data for each digital resource of the plurality of digital resources and the operation data for the digital environment. As used in this disclosure, "utilization indicator" is an indicator of a level of use associated with an individual digital resource for determining a digital resource significance to the digital environment. For example, certain digital resources may have increased levels of utilization compared to other digital resources and may have a higher level of significance to digital environment. Further, in an embodiment, the utilization indicator may include high utilization, average utilization, low utilization, and the like. As used in this disclosure, "high utilization" are digital resources with frequent utilization compared to other digital resources and may have a greater effect on a resource significance score and/or digital environment in the event of failure. "Average utilization," as used in this disclosure are digital resources with utilization similar many digital resources in a digital environment and may have neither a greater nor a decreased effect on a resource significance score and/or digital environment in the event of failure. Further, as used in this disclosure, "low utilization" are digital resources with infrequent utilization compared to other digital resources and may have a minimal effect on a resource significance score and/or digital environment in the event of failure. Alternatively, or additionally, a fuzzy inferencing system for determination of a utilization indicator may be employed, where any or all utilization indicators may be represented as values and/or fuzzy sets for linguistic variables measuring the same, as described in more detail in FIG. 5. An inferencing system may use one or more fuzzy inferencing rules, as described below in FIG. 5, to output one or more linguistic variable values and/or defuzzified values indicating a plurality of utilization indicators. Additionally, or alternatively, determining a utilization indicator for each digital resource of the plurality of digital resources may comprise generating, by the at least a processor 104, a utilization indicator classifier. Utilization indicator classifier may be any classifier as described herein. Utilization indicator classifier may classify digital resource utilization data to one or more types and/or category of utilization indicator, which may include any type of utilization indicator, subcategories and/or more specific categories, or the like. For instance, utilization indicator classifier may receive utilization data and may classify the digital resource associated with the utilization data to a utilization indicator. Utilization indicator classifier may be trained using training data correlating utilization data to categories of utilization indicator. Additionally, or alternatively, the determining the utilization indicator for each of the plurality of digital resources may comprise classifying, by the at least a processor, each digital resource associated with digital environment to at least one utilization indicator using the utilization indicator classifier and outputting, by the at least a processor, the at least one utilization indicator for each digital resource.

Still referring to FIG. 1, additionally, or alternatively, processor 104 may be configured to calculate the resource significance score for each digital resource based on the based on the utilization indicator. For example, the utilization indicator may be used by processor 104 as a basis for the calculation of the resource significance score. In a further exemplary embodiment, digital resources with a higher utilization indicator may be associated with a higher resource significance score as a result of the increased utilization and potential for increased effect on digital environment in the event of failure. Additionally, or alternatively, in an embodiment, digital resources with a lower utilization indicator may be associated with a lower resource significance score as a result of the lower utilization and potential for minimal effect on digital environment in the event of failure.

With continued reference to FIG. 1, processor 104 is configured to determine at least one critical resource 144 as a function of the resource significance score. As used in this disclosure, "critical resource" is a digital resource that is an essential component for operations in the digital environment 116. For example, critical resource may be digital resource that improves functioning of digital environment 116. However, critical resource may not cause failure of the digital environment in the event of failure of the critical resource. In an exemplary embodiment, processor 104 may be configured to generate a ranked list of each resource significance score for each digital resource in the digital environment. For example, processor 104 may generate an ordered list ranking the resource significance scores in decreasing order. Such a list may indicate digital resources with higher resource significance scores as the at least one critical resource 144 for the digital environment. In an embodiment, processor 104 may be configured to determine the at least one critical resource based on the ranked list of each resource significance score. For example, processor 104 may be configured to select a resource with the highest significance score as the at least one critical resource. Further, processor 104 may be able to select a threshold percentage of the ranked list of each resource significance score. In a non-limiting example, processor 104 may be configured to select a top 10%, 5%, 1%, and the like, of digital resources on the ranked list of each resource significance score as the at least one critical resource. Additionally, or alternatively, processor 104 may be configured to compare each resource significance score to a threshold score and select the digital resources with resource significance scores greater than the threshold score as the at least one critical resource.

Still referring to FIG. 1, processor 104 may be configured to analyze a digital security risk associated with the at least one critical resource 144. As used in this disclosure, "digital security risk" is a probability of an adverse event, such as a cyber-attack, on the at least one critical resource. In an exemplary embodiment, the analyzing a digital security risk associated with the at least one critical resource 144 may include calculating a risk level for each of the at least one critical resource. As used in this disclosure, "risk level" is an indication of a probability of an adverse event, such as a cyber-attack, on each of the at least one critical resource. Additionally, or alternatively, the risk level may include a list of vulnerabilities within the critical resource that are susceptible to a cyber-attack.

Continuing to refer to FIG. 1, analyzing a digital security risk associated with the at least one critical resource may include calculating a digital resource risk indicator. In an embodiment, processor 104 may be configured to use digital resource data to calculate the digital resource risk indicator. For example, processor 104 may be configured to associate the digital resource data with a potential risk level and calculate the digital resource risk indicator based on the potential risk level. For instance, and without limitation, digital resource risk indicator may be consistent with digital environment risk record in U.S. patent application Ser. No. 17/963,805, filed on Oct. 11, 2022, and entitled, "APPARATUS AND METHOD FOR DETERMINING A RISK ASSOCIATED WITH A CYBER-ATTACK," which is incorporated by reference herein in its entirety.

With further reference to FIG. 1, processor 104 may be configured to calculate a digital resource risk indicator. The digital resource risk indicator may be an indication of a level of preparedness for preventing and resolving issues associated with a cyber-attack associated with the digital resource.

The digital resource risk indicator may also be an indication of a probability of an adverse event on the digital environment. In a non-limiting example, the adverse event on the digital environment may be a cyber-attack or interruption to operation continuity of the digital environment. In an embodiment, the digital resource risk indicator may include a ranking out of five stars, out of a scale of 1-10, a percentage score, and the like. Alternatively, or additionally, the digital environment risk record 128 may be an alphabetic score, such as, but not limited to, "A+," "A," "A–," "B+," "B," "B–," "C+," "C," "C–," "D+," "D," "D–," "F," and the like. Alternatively, or additionally, the digital resource risk indicator may be a list of vulnerabilities within the digital resource that are susceptible to a cyber-attack. For example, the list of vulnerabilities may be an indication a digital resource may be susceptible to a cyber-attack compared to other digital resources, too many users have unrestricted access to the digital resource that may lead to a large scale cyber-attack, and the like.

With further reference to FIG. 1, processor 104 may be configured to determine the digital resource risk indicator based on the digital resource data. In an exemplary embodiment, processor 104 may be configured to use at least one of the specification data, program data, and other digital resource data to determine the digital resource risk indicator. For example, the processor 104 may be configured to associate each of the specification data, program data, and other digital resource data with a risk level for cyber-attack and determine the digital resource risk indicator based on the associated risk level. Further, processor 104 may be configured to adjust the digital environment risk record based on additional digital resource data.

Figure 2:
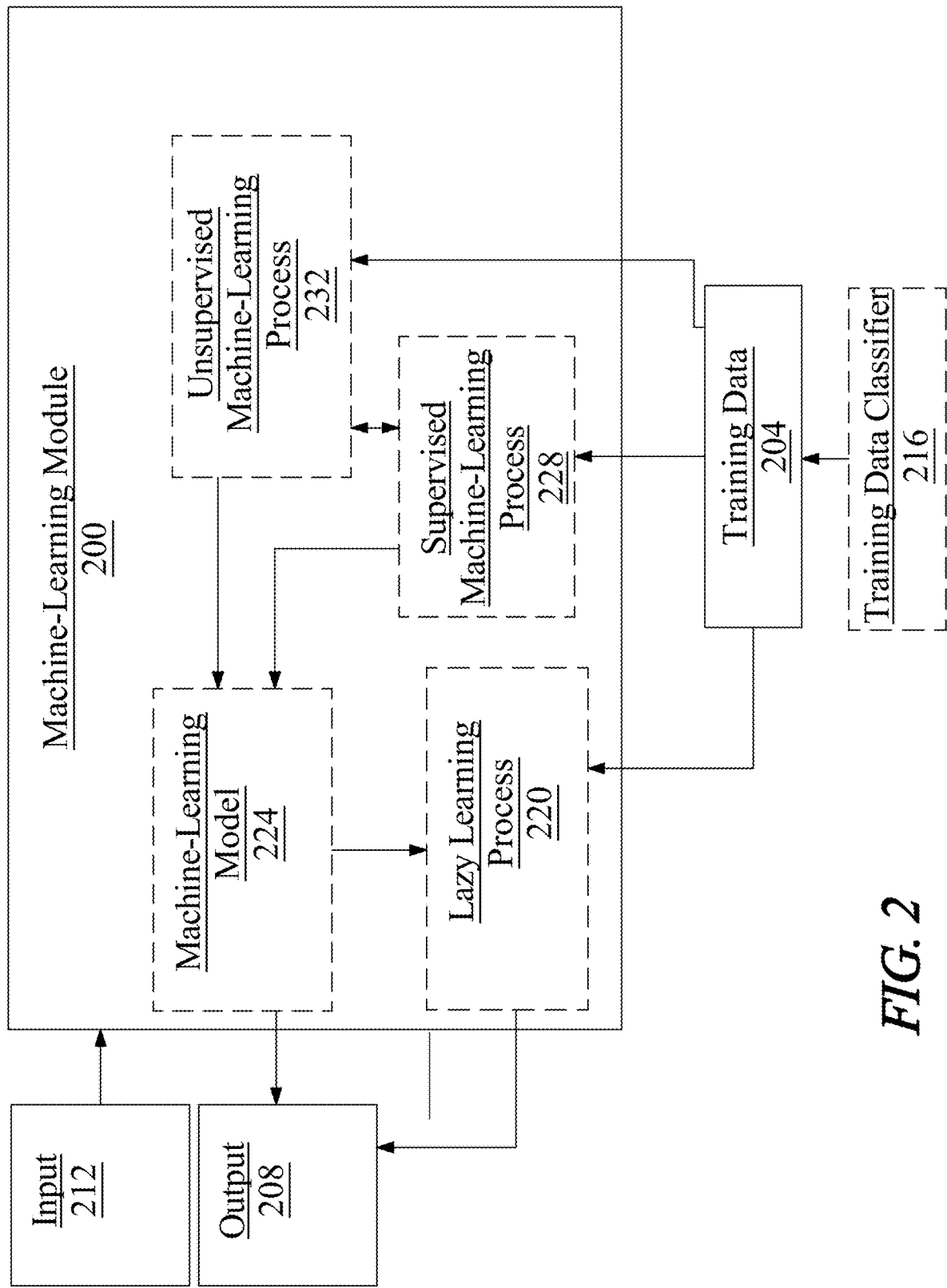
FIG. 2 is an exemplary embodiment of a machine-learning module.

With continued reference to FIG. 1, in an embodiment, the digital resource risk indicator may be determined as a function of digital resource data using a machine learning model, discussed in further detail in FIG. 2, such as a risk indicator machine learning model. The risk indicator machine learning model may be trained by training data, discussed in further detail in FIG. 2, such as risk indicator training data. Risk indicator training data may be stored in database 128.

With continued reference to FIG. 1, the determining of the digital resource risk indicator using a machine learning model may include receiving risk indicator training data. In an embodiment, the risk indicator training data may include a plurality of digital resource data that are each correlated to one of a plurality of risk indicator data. The determining of the digital resource risk indicator using a machine learning model may further include training a risk indicator machine learning model as a function of the risk indicator training data. Further, the determining of the digital resource risk indicator using a machine learning model may also include determining of the digital resource risk indicator using the trained risk indicator machine learning model. Alternatively, or additionally, a fuzzy inferencing system for determination of digital resource risk indicator may be employed, where any or all digital resource risk indicator may be represented as values and/or fuzzy sets for linguistic variables measuring the same. An inferencing system may use one or more fuzzy inferencing rules, as described below in FIG. 5, to output one or more linguistic variable values and/or defuzzified values indicating digital resource risk indicator overall or according to categories.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 204 to generate an algorithm that will be performed by a computing device/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively, or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure. As a non-limiting illustrative example, a user profile may be an input and a predictive quantifier may be an output.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 200 may generate a classifier using a classification algorithm, defined as a process whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 216 may classify elements of training data to categories of users, influence indicators, and/or utilization indicators for which a subset of training data may be selected.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors' algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively, or additionally, and with continued reference to FIG. 2, machine-learning processes as described in this disclosure may be used to generate machine-learning models 224. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include any input as described above as inputs, any output as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 3:
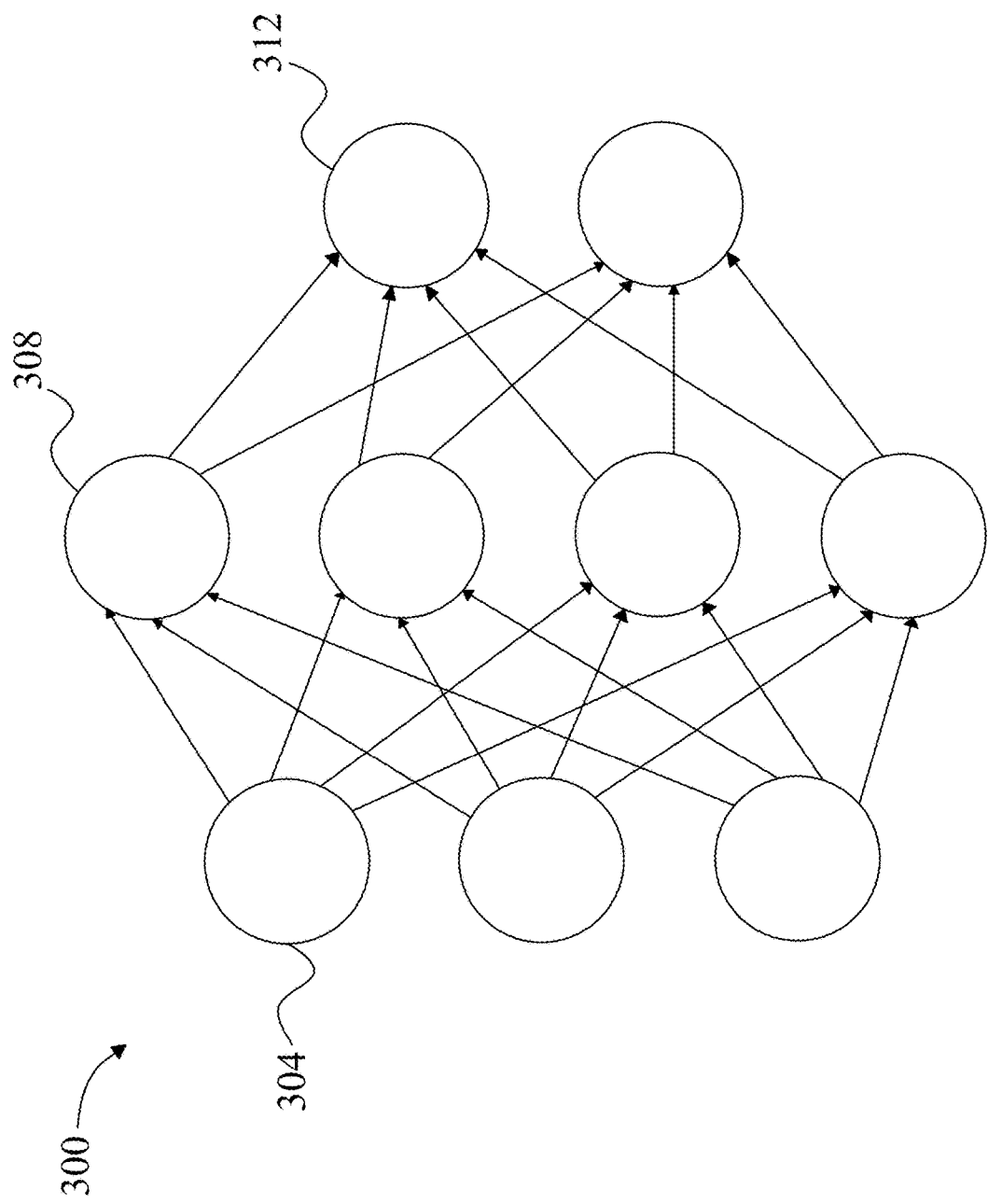
FIG. 3 is a diagram of an exemplary nodal network in accordance with one or more embodiments of the present disclosure.

Referring now to FIG. 3, an exemplary embodiment of neural network 300 is illustrated. A neural network 300 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 304, one or more intermediate layers 308, and an output layer of nodes 312. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network."

Figure 4:
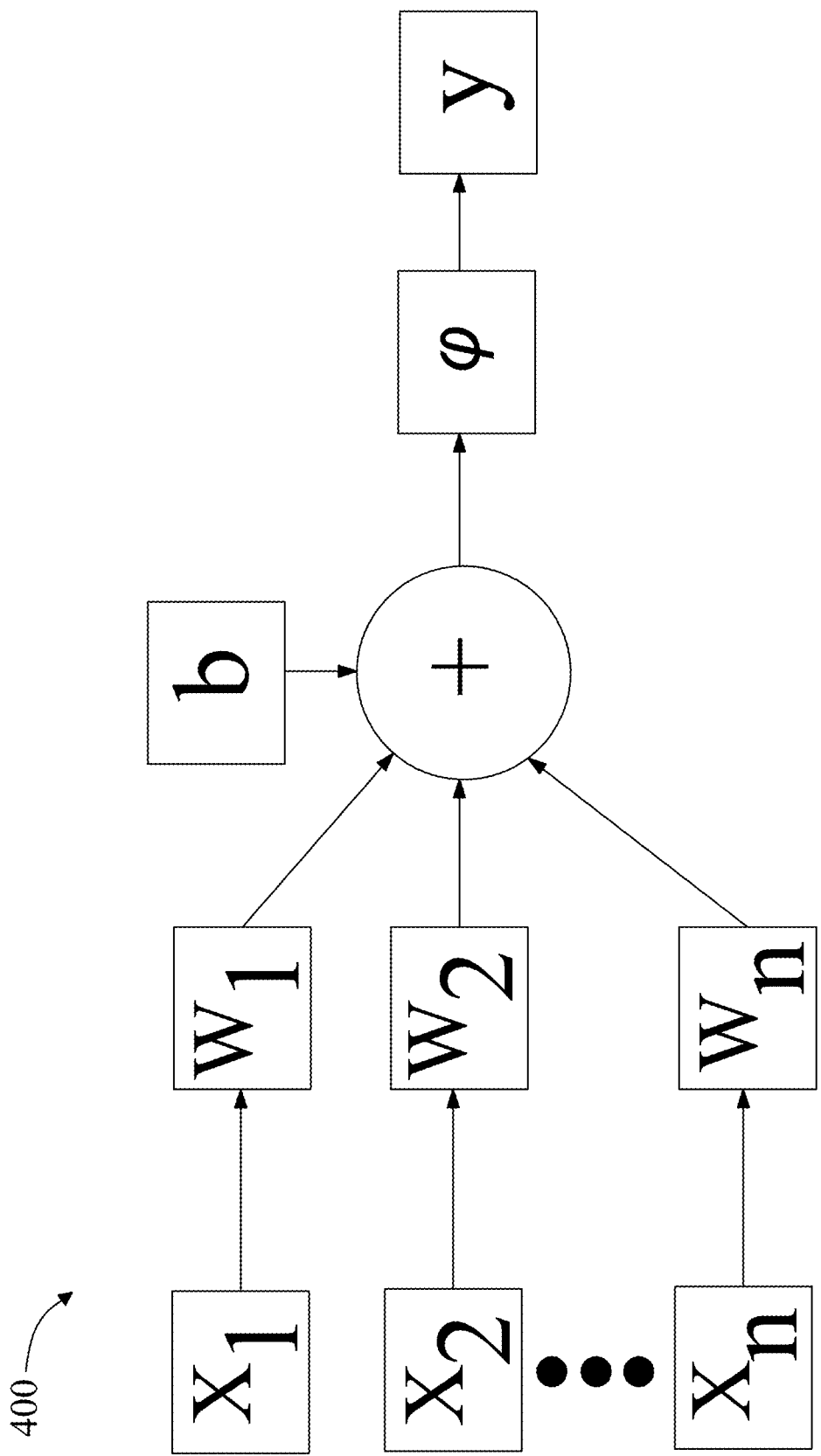
FIG. 4 is a block diagram of an exemplary node in accordance with one or more embodiments of the present disclosure.

Referring now to FIG. 4, an exemplary embodiment of a node of a neural network is illustrated. A node may include, without limitation a plurality of inputs xi that may receive numerical values from inputs to a neural network containing the node and/or from other nodes. Node may perform a weighted sum of inputs using weights $w_i$ that are multiplied by respective inputs xi. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input xi may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 5:
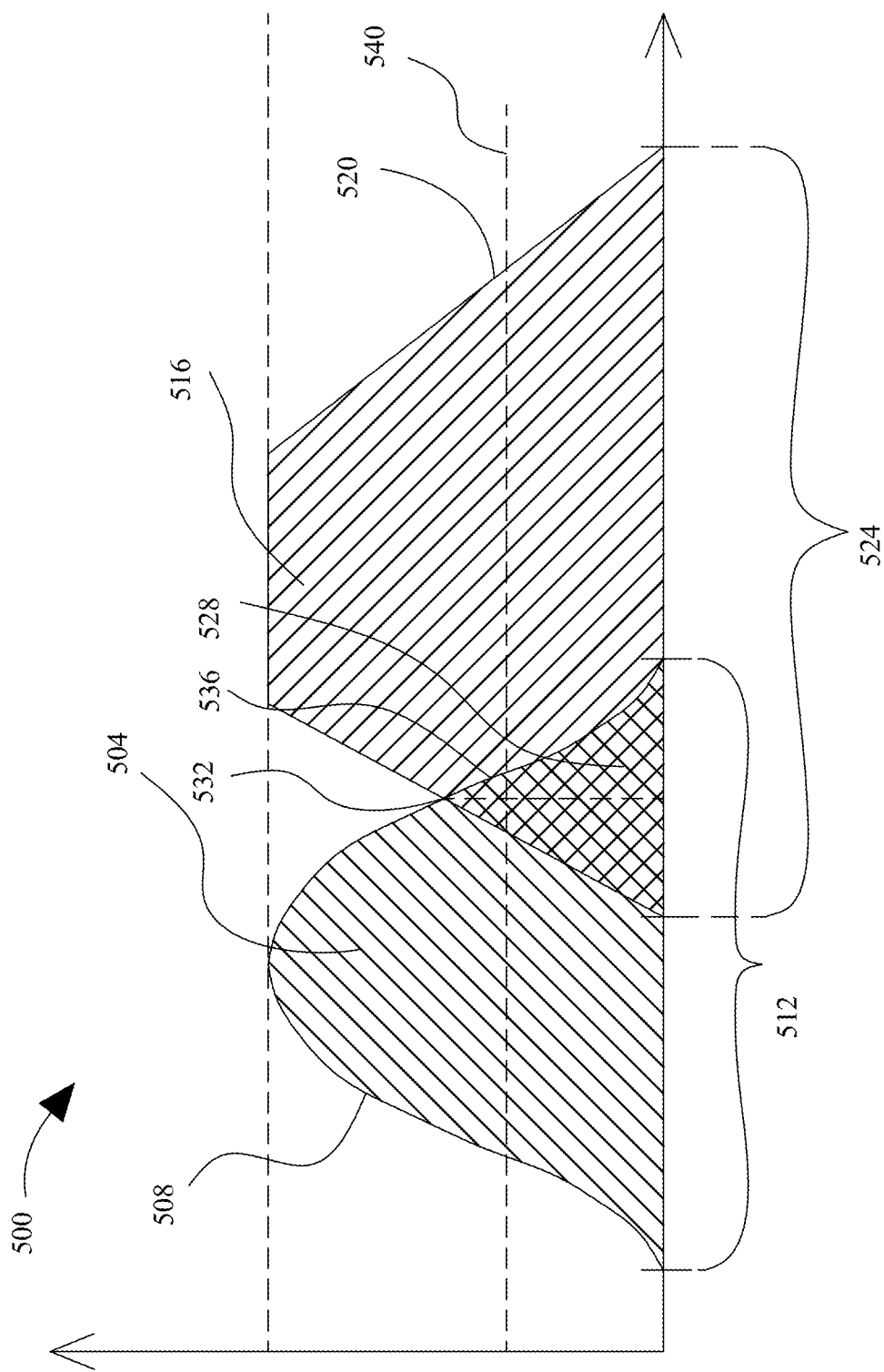
FIG. 5 is a schematic diagram illustrating an exemplary embodiment of a fuzzy inferencing system.

Referring to FIG. 5, an exemplary embodiment of fuzzy set comparison 500 is illustrated. A first fuzzy set 504 may be represented, without limitation, according to a first membership function 508 representing a probability that an input falling on a first range of values 512 is a member of the first fuzzy set 504, where the first membership function 508 has values on a range of probabilities such as without limitation the interval [0,1], and an area beneath the first membership function 508 may represent a set of values within first fuzzy set 504. Although first range of values 512 is illustrated for clarity in this exemplary depiction as a range on a single number line or axis, first range of values 512 may be defined on two or more dimensions, representing, for instance, a Cartesian product between a plurality of ranges, curves, axes, spaces, dimensions, or the like. First membership function 508 may include any suitable function mapping first range 512 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, \text{ for } x > c \text{ and } x < a \\ \frac{x-a}{b-a}, \text{ for } a \leq x < b \\ \frac{c-x}{c-b}, \text{ if } b < x \leq c \end{cases}$$

a trapezoidal membership function may be defined as $$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}(\frac{x-c}{\sigma})^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 5, first fuzzy set 504 may represent any value or combination of values as described above, including output from one or more machine-learning models. A second fuzzy set 516, which may represent any value which may be represented by first fuzzy set 504, may be defined by a second membership function 520 on a second range 524; second range 524 may be identical and/or overlap with first range 512 and/or may be combined with first range via Cartesian product or the like to generate a mapping permitting evaluation overlap of first fuzzy set 504 and second fuzzy set 516. Where first fuzzy set 504 and second fuzzy set 516 have a region 528 that overlaps, first membership function 508 and second membership function 520 may intersect at a point 562 representing a probability, as defined on probability interval, of a match between first fuzzy set 504 and second fuzzy set 516. Alternatively, or additionally, a single value of first and/or second fuzzy set may be located at a locus 566 on first range 512 and/or second range 524, where a probability of membership may be taken by evaluation of first membership function 508 and/or second membership function 520 at that range point. A probability at 528 and/or 562 may be compared to a threshold 540 to determine whether a positive match is indicated. Threshold 540 may, in a non-limiting example, represent a degree of match between first fuzzy set 504 and second fuzzy set 516, and/or single values therein with each other or with either set, which is sufficient for purposes of the matching process; for instance, threshold may indicate a sufficient degree of overlap between an output from one or more machine-learning models, for combination to occur as described above. Alternatively, or additionally, each threshold may be tuned by a machine-learning and/or statistical process, for instance and without limitation as described in further detail below.

Further referring to FIG. 5, in an embodiment, a degree of match between fuzzy sets may be used to classify user data for each user of a plurality of users with at least one corresponding influence indicator. For example, if user data has a fuzzy set matching high influence indicator fuzzy set by having a degree of overlap exceeding a threshold, processor 104 may determine high influence indicator as the influence indicator for the user associated with user data. Where multiple fuzzy matches are performed, degrees of match for each respective fuzzy set may be computed and aggregated through, for instance, addition, averaging, or the like, to determine an overall degree of match.

Still referring to FIG. 5, in an embodiment, user data may be compared to multiple influence indicator fuzzy sets. For instance, user data, as described above, may be represented by a fuzzy set that is compared to each of the multiple influence indicator fuzzy sets; and a degree of overlap exceeding a threshold between the user data fuzzy set and any of the multiple influence indicator fuzzy sets may cause processor 104 to identify each of the influence indicators as recommended influence indicators of the at least one influence indicators. For instance, in one embodiment there may be influence indicator fuzzy sets, representing respectively high influence indicator and average influence indicator. A high influence indicator may have a first fuzzy set; average influence indicator may have a second fuzzy set; and user data may have a user data fuzzy set. Processor 104, for example, may compare a user data fuzzy set with each of high influence indicator fuzzy set and average influence indicator fuzzy set, as described above, and identify either, both, or neither of high influence indicator and average influence indicator as at least one influence indicator for user. Machine-learning methods as described throughout may, in a non-limiting example, generate coefficients used in fuzzy set equations as described above, such as without limitation x, c, and σ of a Gaussian set as described above, as outputs of machine-learning methods.

Still referring to FIG. 5, a processor may use a logic comparison program, such as, but not limited to, a fuzzy logic model to determine a compatibility score. A compatibility score may include, but is not limited to, high compatibility, mid compatibility, low compatibility, and the like; each such score may be represented as a value for a linguistic variable representing score, or in other words a fuzzy set as described above that corresponds to a degree of match of user designation as calculated using any statistical, machine-learning, or other method that may occur to a person skilled in the art upon reviewing the entirety of this disclosure. In other words, a given element of user profile and/or user related data may have a first non-zero value for membership in a first linguistic variable value such as a first influence indicator and a second non-zero value for membership in a second linguistic variable value such as a second influence indicator. In some embodiments, determining a influence indicator may include using a linear regression model. A linear regression model may include a machine learning model. A linear regression model may be configured to map data of user to one or more influence indicators. A linear regression model may be trained using training data as discussed above. In some embodiments, determining at least one influence indicator may include using an influence indicator classification model. A influence indicator classification model may be configured to input collected data and cluster data to a centroid based on, but not limited to, frequency of appearance, and the like. Centroids may include compatibility scores assigned to them such that each user profile and/or user related data may each be assigned a compatibility score. In some embodiments, an urgency classification model may include a K-means clustering model. In some embodiments, an urgency classification model may include a particle swarm optimization model. In some embodiments, determining a compatibility score of user data may include using a fuzzy inference engine. A fuzzy inference engine may be configured to map one or more data elements using fuzzy logic. In some embodiments, a plurality of user designations may be arranged by a logic comparison program into compatibility score arrangements. A "compatibility score arrangement" as used in this disclosure is any grouping of objects and/or data based on degree of match for user designation. This step may be implemented as described above. Membership function coefficients and/or constants as described above may be tuned according to classification and/or clustering algorithms. For instance, and without limitation, a clustering algorithm may determine a Gaussian or other distribution of questions about a centroid corresponding to a given level, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Further referring to FIG. 5, an inference engine may be implemented according to input and/or output membership functions and/or linguistic variables. Continuing the example, an output linguistic variable may represent, without limitation, a community member designation. An inference engine may combine rules, such as: "if the user contribution is 'low' and the user participation is 'low', the user involvement is 'low'"—the degree to which a given input function membership matches a given rule may be determined by a triangular norm or "T-norm" of the rule or output membership function with the input membership function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b≤d), (associativity: T(a, T(b, c))=T(T(a, b), c)), and the requirement that the number 1 acts as an identity element. Combinations of rules ("and" or "or" combination of rule membership determinations) may be performed using any T-conorm, as represented by an inverted T symbol or "⊥," such as max(a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively, or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively, or additionally, output rules may be replaced with functions according to the Takagi-Sugeno-King (TSK) fuzzy model.

Figure 6:
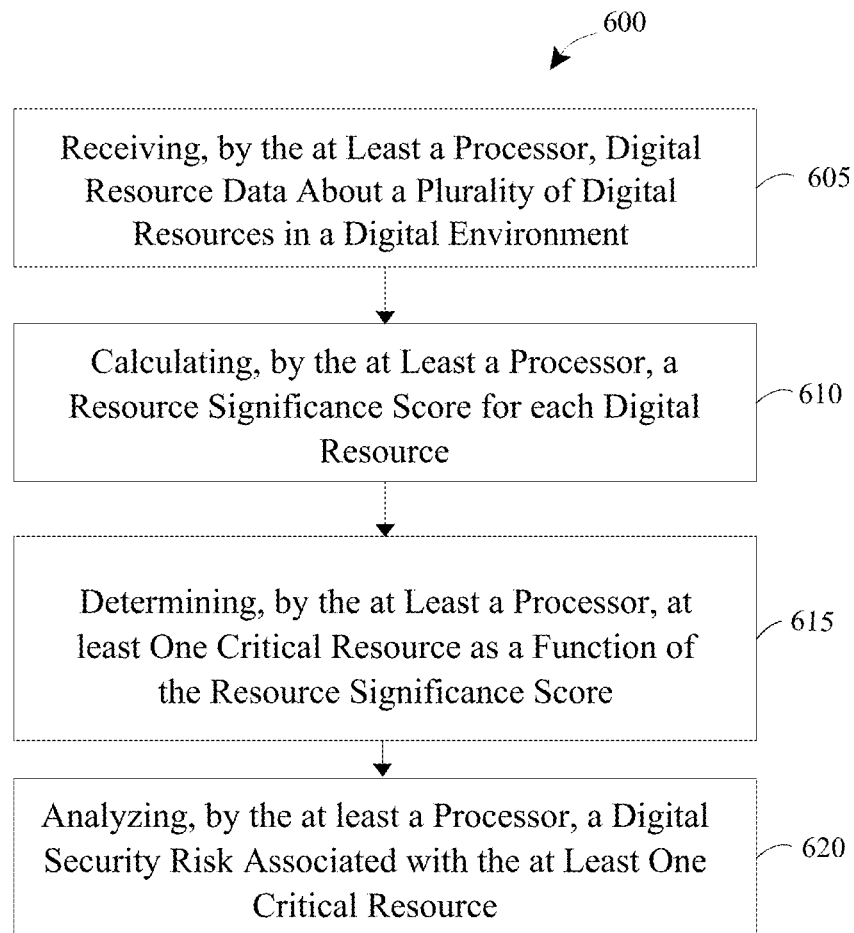
FIG. 6 is a flow diagram illustrating a method for assessing security risk for digital resources in accordance with one or more embodiments of the present disclosure.

Referring now to FIG. 6, an exemplary embodiment of method 600 for assessing security risk for digital resources is shown. Step 605 of method 600 includes receiving, by the at least a processor, digital resource data 124 about a plurality of digital resources in a digital environment. In an embodiment, the receiving digital resource data 124 may comprise receiving, by the at least a processor, user input from a plurality of users in the digital environment, wherein the user input comprises resource significance data. Additionally, or alternatively, the receiving user input may comprise receiving, by the at least a processor, the user input using a digital resource query. Further, method 600 may include determining, by the at least a processor, an influence indicator for each of the plurality of users. In an embodiment, additionally, or alternatively, the determining an influence indicator for each of the plurality of users comprises determining, by the at least a processor, the influence indicator for each of the plurality of users using a machine learning model. These may be implemented, without limitation, as described above in reference to FIGS. 1-5.

Still referring to FIG. 6, step 610 of method 600 includes calculating, by the at least a processor, an resource significance score for each digital resource. Additionally, or alternatively, the calculating the resource significance score may comprise calculating, by the at least a processor, the resource significance score based on user input from the plurality of users. Further, in an embodiment, the method 600 may include calculating, by the at least a processor, the resource significance score for each digital resource based on the digital resource data 124, user input, and the influence indicator. These may be implemented, without limitation, as described above in reference to FIGS. 1-5.

With further reference to FIG. 6, step 615 of method 600 includes determining, by the at least a processor, at least one critical resource as a function of the resource significance score. This may be implemented, without limitation, as described above in reference to FIGS. 1-5.

Continuing to reference FIG. 6, step 620 of method 600 includes analyzing, by the at least a processor a digital security risk associated with the at least one critical resource. This may be implemented, without limitation, as described above in reference to FIGS. 1-5.

Still referring to FIG. 6, method 600 may further include compiling, by the at least a processor, operation data for the plurality of digital resources and digital environment, and comparing, by the at least a processor, the operation data for each digital resource of the plurality of digital resources and the operation data for the digital environment. Additionally, or alternatively, method 600 may include determining, by the at least a processor, a utilization indicator for each digital resource of the plurality of digital resources. Further, in an embodiment, method 400 may include comprising calculating, by the at least a processor, the resource significance score for each digital resource each digital resource based on the utilization indicator. These may be implemented, without limitation, as described above in reference to FIGS. 1-5.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
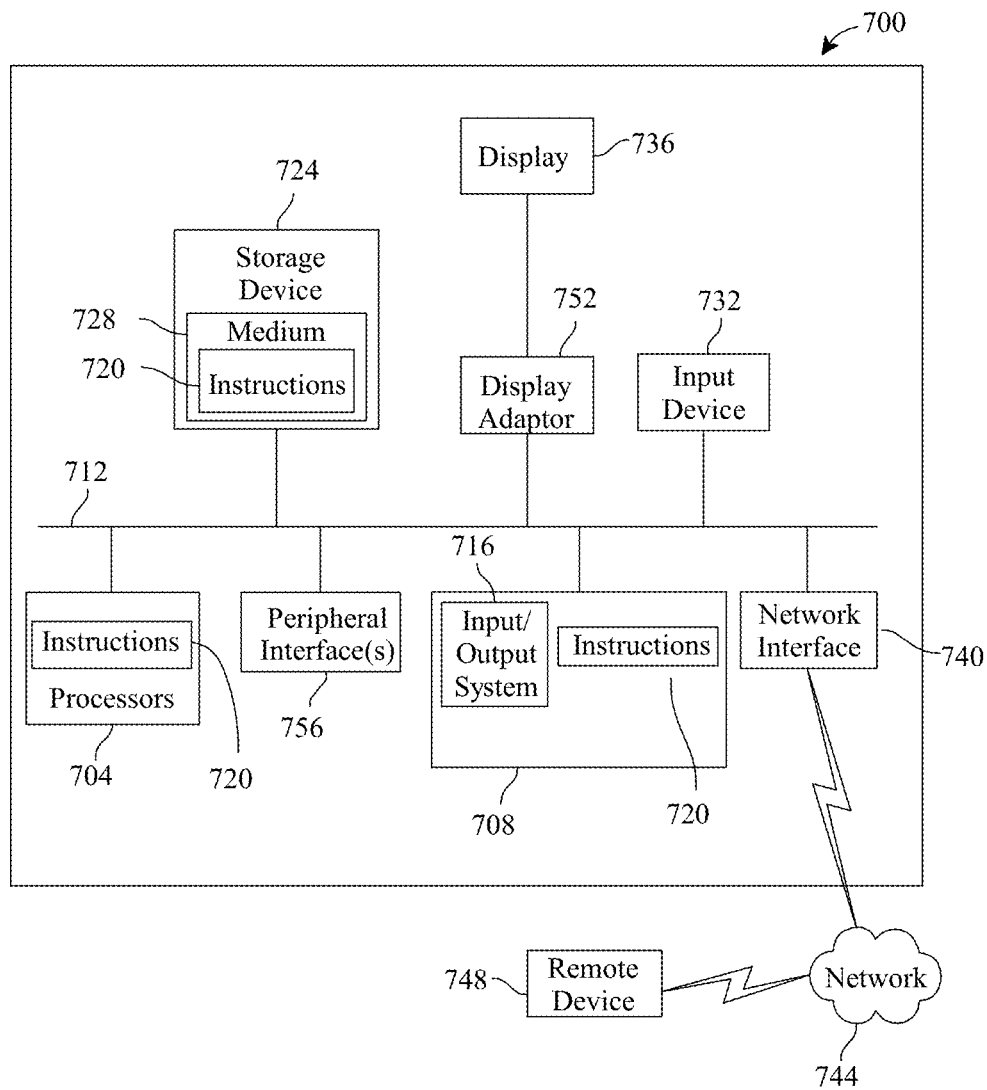
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve apparatuses and methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for assessing security risk for digital resources, the apparatus comprising:
    at least a processor; and
    a memory communicatively coupled to the at least a processor, the memory comprising instructions configuring the at least a processor to:
        receive digital resource data about a plurality of digital resources in a digital environment;
        calculate a resource significance score for each digital resource based on the digital resource data utilizing a resource significance machine learning model which comprises:
            training the resource significance model with resource significance training data, wherein:
            the resource significance training data contains a plurality of data entries containing a plurality of digital resource data inputs correlated to a plurality of resource significance data;
        training the resource significance machine learning model further comprises updating the resource significance training data with the input and output results from the resource significance machine learning model and retraining the resource significance model with an updated resource significance training data; and
        training the resource significance machine-learning model further comprises training the resource significance machine-learning model with a supervised machine-learning process and a neural network or polynomial regression algorithm;
        determine at least one critical resource as a function of the resource significance score; and
        analyze a digital security risk associated with the at least one critical resource; and
        calculate a digital resource risk indicator utilizing a risk indicator machine learning model which comprises:
            training the risk indicator machine learning model with risk indicator training data, wherein the risk indicator training data contains a plurality of data entries containing a plurality of digital resource data as inputs correlated to a to a plurality of risk indicator data, wherein training the risk indicator machine learning model further comprises updating the risk indicator training data with the input and output results from the risk indicator machine learning model and retraining the risk indicator model with an updated risk indicator training data; and
        display the digital resource risk indicator and the at least at critical resource on a graphical user interface to provide a level of preparedness for preventing and resolving issues associated with a cyber-attack.

2. The apparatus of claim 1, wherein receiving digital resource data comprises receiving user input from a plurality of users in the digital environment, wherein the user input comprises user resource significance data.

3. The apparatus of claim 2, wherein the receiving the user input comprises receiving the user input using a digital resource query.

4. The apparatus of claim 3, wherein calculating the resource significance score comprises calculating the resource significance score based on the user resource significance data.

5. The apparatus of claim 2, wherein the memory further comprises instructions configuring the at least a processor to determine an influence indicator for each of the plurality of users.

6. The apparatus of claim 5, wherein the determining an influence indicator for each of the plurality of users comprises determining the influence indicator for each of the plurality of users using a machine learning model.

7. The apparatus of claim 5, wherein the memory further comprises instructions configuring the at least a processor to calculate the resource significance score for each digital resource based on the digital resource data, user input, and the influence indicator.

8. The apparatus of claim 1, wherein the memory further comprises instructions configuring the at least a processor to:
 compile operation data for the plurality of digital resources and the digital environment; and
 compare the operation data of each digital resource of the plurality of digital resources against an aggregated operation data of all the digital resources that represent the digital environment.

9. The apparatus of claim 8, wherein the memory further comprises instructions configuring the at least a processor to determine a utilization indicator for each digital resource of the plurality of digital resources based on the comparison of the operation data for each digital resource of the plurality of digital resources and the operation data for the digital environment.

10. The apparatus of claim 9, wherein the memory further comprises instructions configuring the at least a processor to calculate the resource significance score for each digital resource each digital resource based on the utilization indicator.

11. A method for assessing security risk for digital resources comprising:
 receiving, by at least a processor, digital resource data about a plurality of digital resources in a digital environment;
 calculating, by the at least a processor, a resource significance score for each digital resource utilizing a resource significance machine learning model which comprises:
  training the resource significance model with resource significance training data, wherein:
   the resource significance training data contains a plurality of data entries containing a plurality of digital resource data inputs correlated to a plurality of resource significance data;
   training the resource significance machine learning model further comprises updating the resource significance training data with the input and output results from the resource significance machine learning model and retraining the resource significance model with an updated resource significance training data; and
  training the resource significance machine-learning model further comprises training the resource significance machine-learning model with a supervised machine-learning process and a neural network or polynomial regression algorithm;
 determining, by the at least a processor, at least one critical resource as a function of the resource significance score; and
 analyzing, by the at least a processor, a digital security risk associated with the at least one critical resource; and calculate a digital resource risk indicator utilizing a risk indicator machine learning model which comprises:
  training the risk indicator machine learning model with risk indicator training data, wherein the risk indicator training data contains a plurality of data entries containing a plurality of digital resource data as inputs correlated to a to a plurality of risk indicator data, wherein training the risk indicator machine learning model further comprises updating the risk indicator training data with the input and output results from the risk indicator machine learning model and retraining the risk indicator model with an updated risk indicator training data; and
 display the digital risk indicator and the at least at critical resource on a graphical user interface to provide a level of preparedness for preventing and resolving issues associated with a cyber-attack.

12. The method of claim 11, wherein the receiving digital resource data comprises receiving, by the at least a processor, user input from a plurality of users in the digital environment, wherein the user input comprises user resource significance data.

13. The method of claim 12, wherein the receiving the user input comprises receiving, by the at least a processor, the user input using a digital resource query.

14. The method of claim 13, wherein calculating the resource significance score comprises calculating, by the at least a processor, the resource significance score based on the user resource significance data.

15. The method of claim 12, further comprising determining, by the at least a processor, an influence indicator for each of the plurality of users.

16. The method of claim 15, wherein determining the influence indicator for each of the plurality of users comprises determining, by the at least a processor, the influence indicator for each of the plurality of users using a machine learning model.

17. The method of claim 15, further comprising calculating, by the at least a processor, the resource significance score for each digital resource based on the digital resource data, user input, and the influence indicator.

18. The method of claim 11, further comprising:
 compiling, by the at least a processor, operation data for the plurality of digital resources and the digital environment; and
 comparing, by the at least a processor, the operation data of each digital resource of the plurality of digital resources against an aggregated operation data of all the digital resources that represent the digital environment.

19. The method of claim 18, further comprising determining, by the at least a processor, a utilization indicator for each digital resource of the plurality of digital resources based on the comparison of the operation data for each digital resource of the plurality of digital resources and the operation data for the digital environment.

20. The method of claim 19, further comprising calculating, by the at least a processor, the resource significance score for each digital resource each digital resource based on the utilization indicator.

* * * * *